United States Patent Office 3,449,799
Patented June 17, 1969

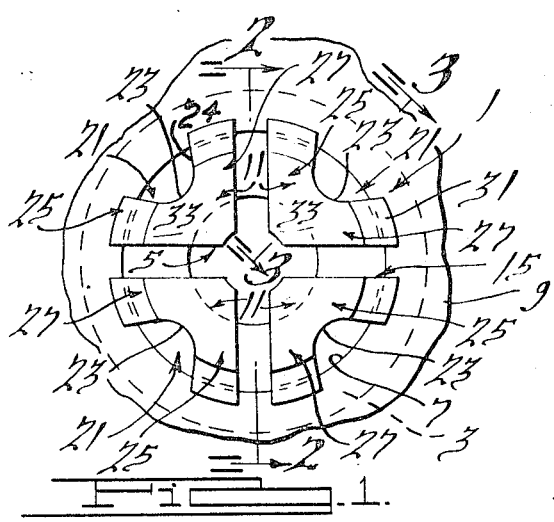
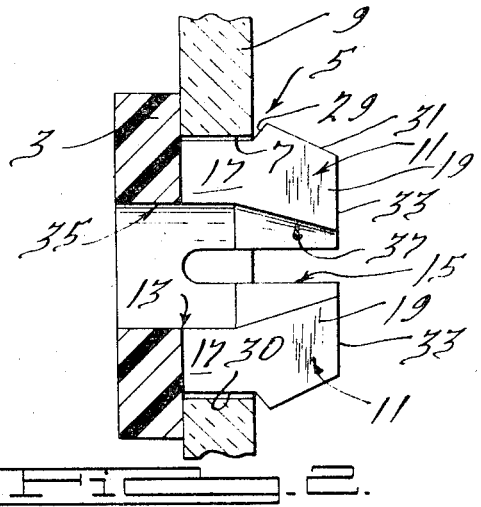
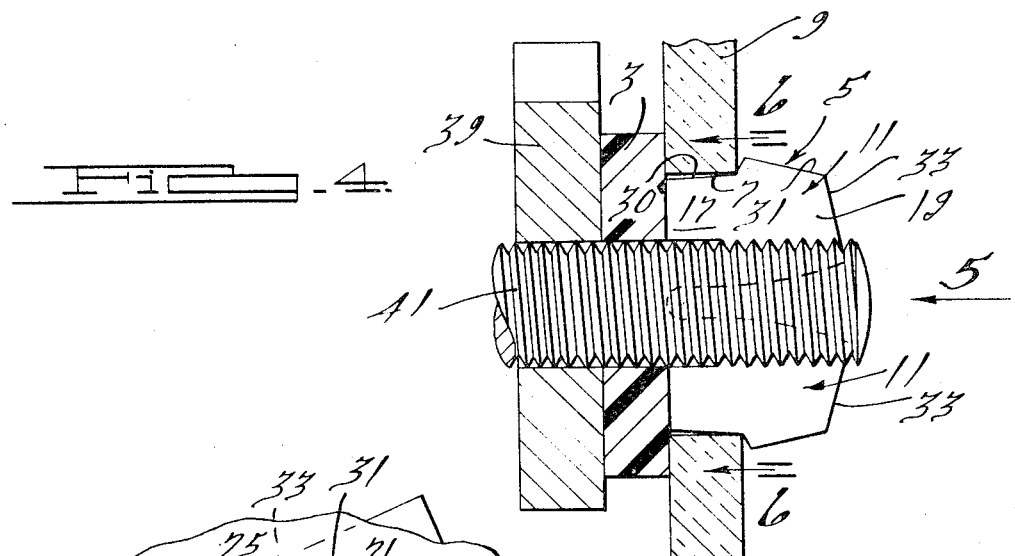
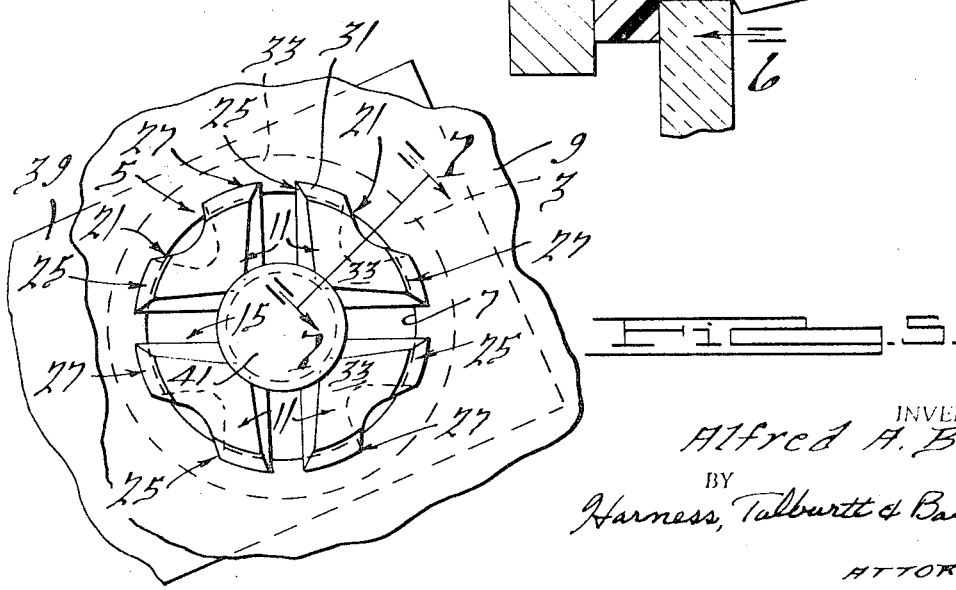

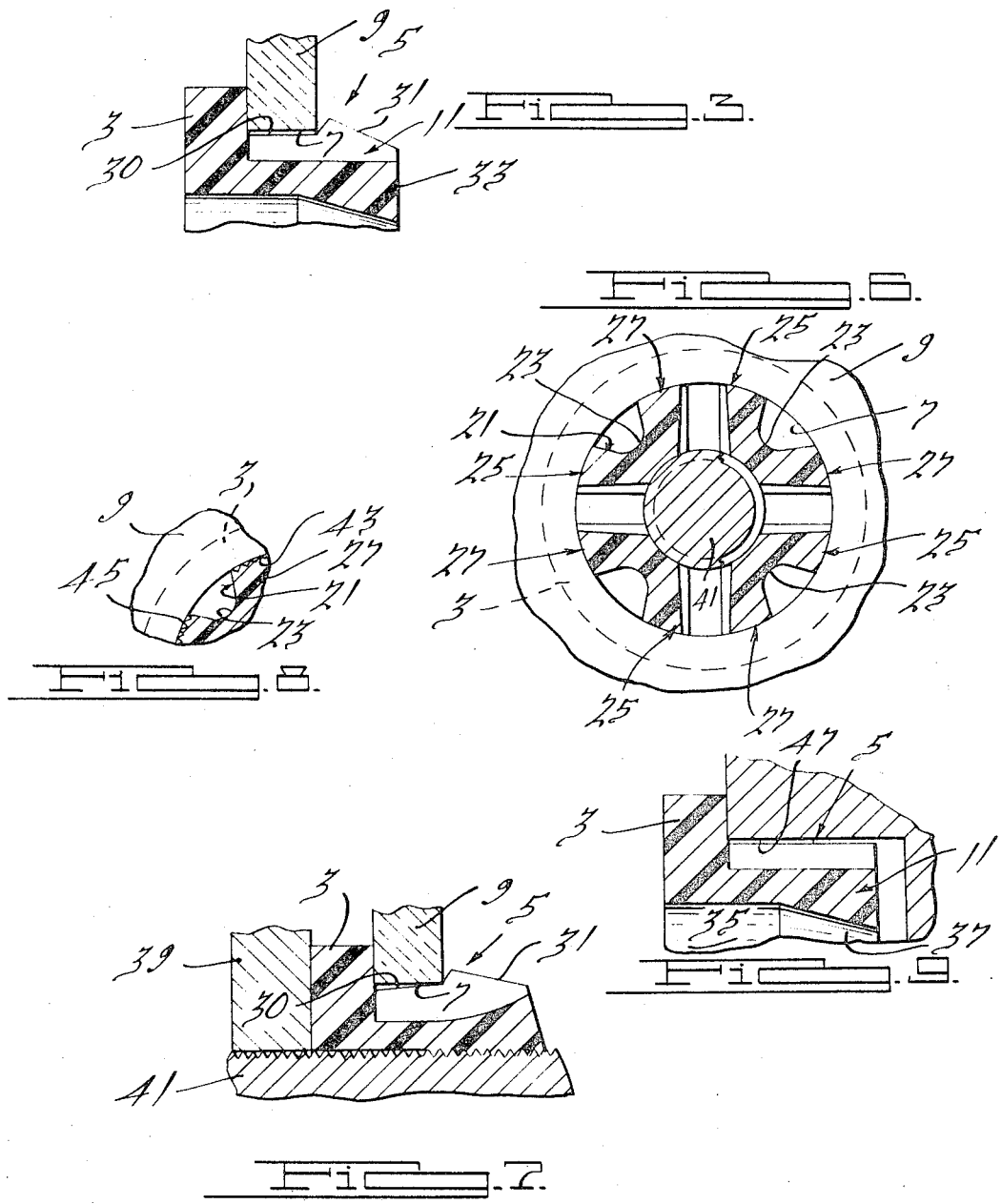

3,449,799
FASTENER FOR CONNECTING APERTURED STRUCTURE TO ANOTHER STRUCTURE
Alfred A. Bien, Birmingham, Mich., assignor to Chrysler Corporation, Highland Park, Mich., a corporation of Delaware
Filed June 1, 1967, Ser. No. 642,822
Int. Cl. A44b 21/00
U.S. Cl. 24—73    14 Claims

ABSTRACT OF THE DISCLOSURE

Fastening member for joining one structural member to a second structural member having a hole therein. The fastening member includes a head and a shank, the shank comprising a plurality of generally V-shaped fingers. A bore having a tapered portion extends through the head and shank for receiving a rigid pin or bolt for expanding the V-shaped fingers against the surface of the second structural member around the hole, the sides of the V-shaped fingers being spread apart as the fingers are expanded.

Background of the invention

This invention relates to fasteners or grommets, and more particularly to a plastic fastener or grommet adapted to be applied to an apertured restraining structure for connecting another structure to the apertured structure.

It has heretofore been suggested to provide a grommet or fastener having a head with a shank portion extending from the head adapted to be inserted through an aperture in a structure. The head and shank were provided with a bore, into which an expanding element, such as a rod or screw, was inserted for expanding the shank portion into frictional gripping contact with the surface of the apertured structure around the aperture.

Fasteners or grommets such as described above have been used in the automotive industry, for example, to secure linkage components to windows for raising and lowering the latter. These grommets have not been altogether satisfactory because of the possibility of glass breakage when the pin or screw was inserted. As the pin or screw is inserted into the grommet the shank portions were compressed between the pin and the surface of the aperture through which the grommet extended. While the compressed shank portions created a strong frictional grip between the grommet and the surface of the aperture, they also created high stress concentrations in the glass around the aperture. As a result of the high stress concentrations, the glass would often crack, thereby requiring its removal and replacement with another glass window. This was an expensive and time consuming process. This invention permits a strong frictional grip to be created between the grommet and the surface of the aperture without creating high stress concentrations in the structure surrounding the aperture. It's usefulness is not limited to the automobile industry, but rather extends to many industries in which it is desired to joint two structural members together with a grommet or fastener.

Summary of the invention

Briefly, a grommet or fastener of this invention comprises a body having a head portion and a shank portion extending from the head portion, the head and shank portions having a bore therethrough, the shank portion being formed of a plurality of fingers each of which has a groove or recess on its outer side to form wings adapted to be spread apart against the surface surrounding an aperture upon the application of a force on the inside of the finger.

One of the primary objects of this invention is to provide a grommet for connecting an aperture structure to another structure which forms a strong frictional grip with the apertured structure without creating high stress concentrations in the apertured structure around the aperture.

Another object of this invention is to provide a grommet of the type described which allows for variations in the thickness of the apertured structure without detraction from the gripping ability of the grommet.

A further object of this invention is to provide a grommet such as described which allows for variations in the size of the aperture without detraction from the gripping ability of the grommet.

Still another object of this invention is to provide a grommet of the class described which when installed through an aperture is prevented from rotation in the aperture.

Another object of this invention is to provide a grommet such as described which, when utilized for connecting a metal structure to a glass structure, isolates the metal structure from the glass structure.

A further object of this invention is to provide a grommet of the type described which is economical in construction, and is effective and durable in operation.

Other objects and advantages of this invention will become apparent as the description progresses.

Brief description of the drawings

In the accompanying drawings, in which several of various possible embodiments of this invention are illustrated:

FIG. 1 is an elevational view of a fastener constructed in accordance with this invention, looking at the shank end of the fastener;

FIG. 2 is a section taken along line 2—2 of FIG. 1;

FIG. 3 is a section taken along line 3—3 of FIG. 1;

FIG. 4 is a section generally similar to FIG. 2 showing the grommet and structures in fastened or coupled condition;

FIG. 5 is an end view of FIG. 4 looking from the righthand end thereof;

FIG. 6 is a section taken along line 6—6 of FIG. 4;

FIG. 7 is a section taken along line 7—7 of FIG. 5;

FIG. 8 is a fragmentary view similar to a portion of FIG. 6, illustrating another embodiment of this invention; and FIG. 9 is a fragmentary view similar to FIG. 3 illustrating a third embodiment of this invention.

Like parts are indicated by corresponding reference characters throughout the several views of the drawings.

Description of the preferred embodiment

Referring now to the drawings, a grommet of this invention is generally indicated at 1. It is preferably formed of a plastic material and comprises a circular head portion 3 and a shank portion 5 extending away from the head portion. As shown, shank portion 5 extends through an aperture 7 in a panel structure 9, such as an automotive vehicle window glass, for example.

Shank portion 5 comprises a plurality of resilient fingers 11 formed by a bore 13 through the grommet and a plurality of slots 15 through the shank portion. Each finger 11 includes a finger shank portion 17 and a foot portion 19. A channel, groove, or elongated recess 21 is provided in the radially outer surface of each finger and has a radius portion 23 at the bottom thereof. Channels 21 extend throughout the complete length of the fingers with the sides 24 of the channel being disposed approximately 90° to one another. The channel 21 in each finger causes the latter to have a generally V-shaped cross section in a transverse direction with two diverging wings 25 and 27, which, as will be made apparent hereinafter, are adapted to be spread apart or open further upon the application of an outwardly directed force on the inside of the finger.

Each foot portion 19 includes an outwardly tapered shoulder 29 (FIG. 2) extending away from the outer surface 30 of finger shank portion 17 and head 3, at the outer end of each of the wings 25 and 27. A tapered camming surface 31 extends from shoulder 29 inwardly to an end face 33 of each wing.

Bore 13 includes a first cylindrical portion 35 extending through head 3 and a portion of shank portion 5. An inwardly tapered or frusto-conical section 37 extends from the end of portion 35 to the end faces 33 of the fingers 11. The length of cylindrical portion 35, as shown, is less than the sum of the thickness of head 3 plus the length of finger shank portions 17. Since the length of finger shank portion 17 is approximately equal to the thickness of the panel structure 9, it may also be said that, as shown, the length of cylindrical portion 35 is less than the combined thickness of head 3 and panel structure 9. However, as will be made apparent, if the portion 37 is tapered sufficiently, the cylindrical portion 35 may have a length greater than the combined sum of the thickness of head 3 and length of shank portion 17.

A structure, such as an arm 39 of a vehicle window regulator, for example, is adapted to be connected to window 9 by grommet or fastener 1 in the following manner:

Fastener 1 is first inserted into aperture 7 by guiding the leading portions of fingers 11 into the aperture. The distance between the radially outer edges of diametrically opposite end faces 33 is less than the diameter of aperture 7 so that the outer ends of the fingers are easily inserted into the aperture. Pressure is applied to head 3, thereby causing the engagement of the camming surfaces 31 with the glass surface around the aperture to force the fingers radially inwardly. After the upper edges of the shoulders 29 have passed the right-hand edge of the aperture as viewed in FIGS. 2 and 4, the fingers tend to snap back to their original positions. The distance between the radially outer surfaces of diametrically opposite wing shank portions 17 is preferably equal to or slightly less than the diameter of the aperture so that either such shank portion surfaces lightly engage or provide a slight clearance with regard to the inside surface of the glass 9 around aperture 7. The shoulders 29 are sloped to allow for a variation in the thickness of the glass 9. If the glass were slightly thicker than shown in FIGS. 2 and 4, for example, the edge of the glass 9 around the aperture 7 would engage the shoulders 29 at points between the inner and outer ends thereof.

An elongate pin or bolt 41 is then inserted through an aperture in arm 39 into bore portion 35. The diameter of pin or bolt 41 is preferably approximately equal to the diameter of cylindrical bore portion 35. Thus, the pin or bolt will not exert any outward force on the fingers, while it passes through the cylindrical bore portion 35.

As the leading end of bolt 41 enters the tapered bore portion 37 the bolt forces the adjacent portions of the finger 11 outwardly in a radial direction. It will be seen that these outward forces are applied generally in a direction between the wings 25 and 27 of each finger. This action causes the outer surfaces of the portions of the wings 25 and 27, which are vertically aligned with the glass 9 and the tapered bore portion 37 as viewed in FIGS. 2 and 4, to be forced into frictional contact with the glass surface forming the wall of aperture 7. As the fingers are spread apart further by the incoming bolt 41, the wings 25 and 27 to spread apart or open so that a predetermined frictional grip is maintained between the contacting surfaces of the glass and wings even though the inner portions of the fingers are being radially expanded. It will be seen that the slots 15 permit the wings 25 and 27 to spread apart as an axial force is applied to the frusto-conical surface portions 37 of the respective fingers by the bolt 41. Thus, a uniform frictional grip is attained and maintained by the grommet and damaging stress concentrations in the structure 9 around aperture 7 are avoided.

As the leading end of bolt 41 approaches the end faces 33, the foot portion 19 of each wing swings outwardly toward the position shown in FIG. 4, causing the shoulders 29 of each finger to frictionally engage, if they are not already engaged with, the glass 9 around the periphery of the aperture. After a predetermined frictional grip is exerted by the shoulders, continued outward movement of the foot portion 19 causes the wings to spread or diverge, thereby preventing undue pressure on the glass.

It will be understood that as the bolt 41 is moved through the tapered portion 37 of the bore, the bolt threads may form threads in the tapered portion of the grommet if the latter is constructed of a material which is relatively soft as compared to the material out of which the bolt is constructed or as compared to the hardness and sharpness of the edges of the threads of the bolt. However, it will also be understood that element 41 may be in forms other than a threaded bolt, such as a non-threaded pin, for example.

When the bolt 41 is inserted into the bore 13 a sufficient distance, the grommet 1 will be secured in the aperture. The frictional grip exerted by wings 25 and 27 prevents rotation of the grommet in hole 9. The arm 39, due to the bolt 41 and grommet 1 is thus attached to the glass 9. However, head 3 prevents contact between or insulates the glass and the arm.

A second embodiment of this invention is illustrated in FIG. 8. This embodiment is generally similar to the embodiment shown in FIGS. 1–7. However, the outer surfaces of the shank portions 17 of wings 25 and 27 are provided with a plurality of elongated grooves 43 extending away from head 3 which cause such outer surfaces to be formed as ridges 45 extending generally parallel to the fingers. The edges of the multiple ridges are adapted to exert a biting effect on the surface of structure 9 around aperture 7. This ridge-type construction may be particularly effective when the structure 9 is relatively thin, such as a sheet of metal for example.

A third embodiment of this invention is shown in FIG. 9. In the embodiment the shoulder 29 and camming surfaces 31 are omitted from the ends of wings 25 and 27 but the remaining portions of the grommet is substantially identical to the embodiment shown in FIGS. 1–7. The embodiment shown in FIG. 9 is particularly useful for attaching one structural member to a second structural member having a cavity 47 therein. The feet 19 of the embodiment shown in FIGS. 1–7 are unnecessary since the fingers do not extend completely through the second structural member.

It will be understood that the grooves 43 shown in the embodiment shown in FIG. 8 could also be formed in the fingers of the embodiments shown in FIGS. 1–7 and 9, if desired. Moreover, head 3 does not have to be diametrically larger than shank portion 5.

It will be seen that the grommet of this invention may be applied in many instances where it is desired to join two members together and is not limited solely to the automotive industry.

The provision of the wings 25 and 27, which are capable of diverging or spreading apart as pressure is applied on the frusto-conical surface 37, not only create a uniform grip on the structure 9 as the bolt 41 is inserted, but also permit and compensate for variation in the sizes of the aperture 7.

In view of the foregoing, it will be seen that the several objects and advantages of this invention are attained.

Although only three embodiments of the invention have been disclosed and described, it is apparent that other embodiments and modifications of the invention are possible.

I claim:

1. A fastener adapted to be connected to a restraining member having a hole therein, comprising a body having a head portion, and a shank portion extending away from said head portion and adapted to be inserted into said hole, said head and shank portions having a hole extending therethrough, said shank portion comprising a plurality of fingers separated from one another, each of said fingers having two wings extending away from one another on opposite sides of the respective finger, a recess extending along each finger from one wing to the other, the edge portions of said wings being adapted to engage said member in said hole therein when said shank portion is inserted therein and force is applied to the inside surface of said shank portion, the bottom of said recess in each finger generally midway between said wings of each finger being spaced from the member within said hole therein when said shank portion is inserted therein to permit said bottom of said recess to move toward said member and the edge portions of said wings to spread apart upon the application of force on the inside of the respective finger.

2. A fastener as set forth in claim 1 wherein each of said wings extends outwardly from its respective finger and has an outwardly extending shoulder spaced from said head portion.

3. A fastener as set forth in claim 1 wherein each of said wings extends outwardly from its respective finger and has a camming surface extending from the free end of the respective finger outwardly and toward said head portion.

4. A fastener as set forth in claim 1 wherein said hole includes a tapered portion extending from a point spaced from said head portion toward the free end portion of said shank portion.

5. A fastener as set forth in claim 1 wherein each of said wings extends outwardly from its respective fingers and has an outwardly extending shoulder spaced from said head portion, each wing also having a camming surface extending from the free end of the responsive finger outwardly and toward the shoulder on the respective wing, and said bore including a frusto-conical portion extending from a point spaced from said head portion toward the free end portion of said shank portion.

6. A fastener as set forth in claim 1 wherein each of said wings includes a plurality of grooves in the outer face thereof extending generally parallel thereto.

7. A fastener adapted to be connected to a restraining member having a hole therein, said fastener comprising a head portion larger than the distance across said hole, a shank portion extending away from said head portion and adapted to be inserted into said hole, said head and shank portions having a hole therethrough, said shank portion comprising a plurality of individual fingers extending away from said head portion, said fingers being spaced apart from one another, each finger being generally V-shaped in transverse cross-section, with the sides of the V forming wing portions, the outer edge portions of said wing portions being adapted to engage said member in said hole when said shank portion is inserted therein and force is applied to the inside surface of the respective finger, and the outer edge portions of said wing portions of each finger being adapted to spread apart from one another and toward the adjacent finger as the force applied to the inside surface of the respective finger is increased.

8. A fastener as set forth in claim 7 wherein said hole in said fastener has a tapered portion therein causing the distance across the hole in the fastener to decrease toward the free end of said shank portion.

9. A fastener as set forth in claim 7 wherein said hole in said fastener is a bore having a cylindrical portion and a frusto-conical portion, said fingers being located circumferentially around said bore.

10. A fastener as set forth in claim 9 wherein each of said wing portions has a plurality of ridges in the outer face thereof extending generally parallel thereto.

11. A fastener as set forth in claim 9 wherein each of said wing portions has a camming surface extending from the free end of the respective finger outwardly and toward said head portion.

12. A fastener as set forth in claim 7 wherein each of said wing portions has an outwardly extending shoulder spaced from said head portion.

13. A fastener as set forth in craim 7 wherein each of said wing portions has a camming surface extending from the free end of the respective finger outwardly and toward said head portion.

14. A fastener as set forth in claim 13 wherein each of said wing portions has an outwardly extending shoulder spaced from said head portion.

References Cited
UNITED STATES PATENTS

| | | | |
|---|---|---|---|
| 2,788,047 | 4/1957 | Rapata | 85—80 |
| 3,203,304 | 8/1965 | Rapata | 85—83 |
| 3,231,300 | 1/1966 | Moroney | 287—93 |

FOREIGN PATENTS 642,940   2/1964   Belgium.

DONALD A. GRIFFIN, *Primary Examiner.*

U.S. Cl. X.R.

85—80; 287—93